Figure 1:
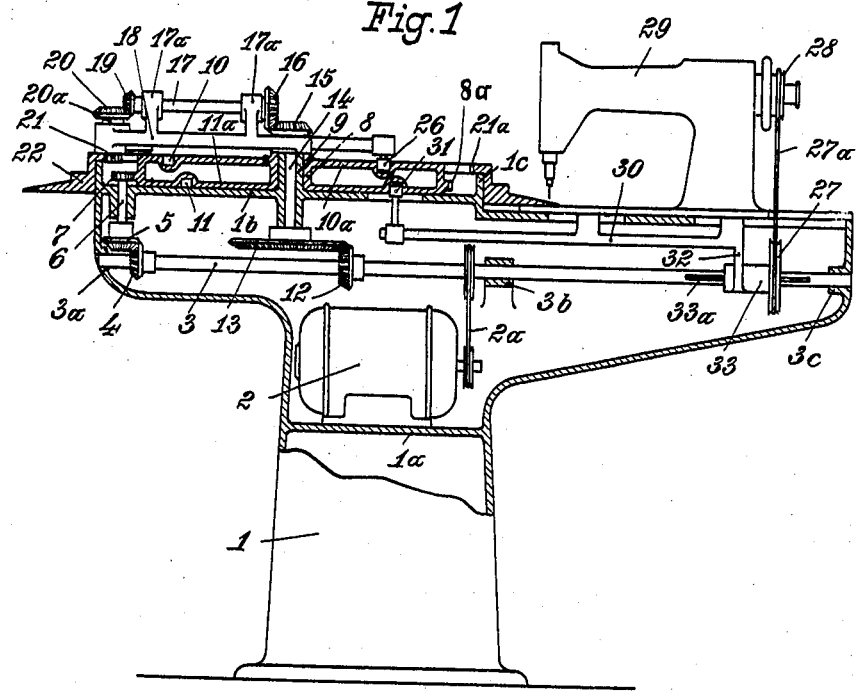

March 28, 1944. W. H. DITTRICH 2,345,104
APPARATUS FOR MOVING TOOL MEANS IN AN IRREGULAR PATH
Filed April 22, 1940 2 Sheets-Sheet 1

Inventor:
W. H. Dittrich

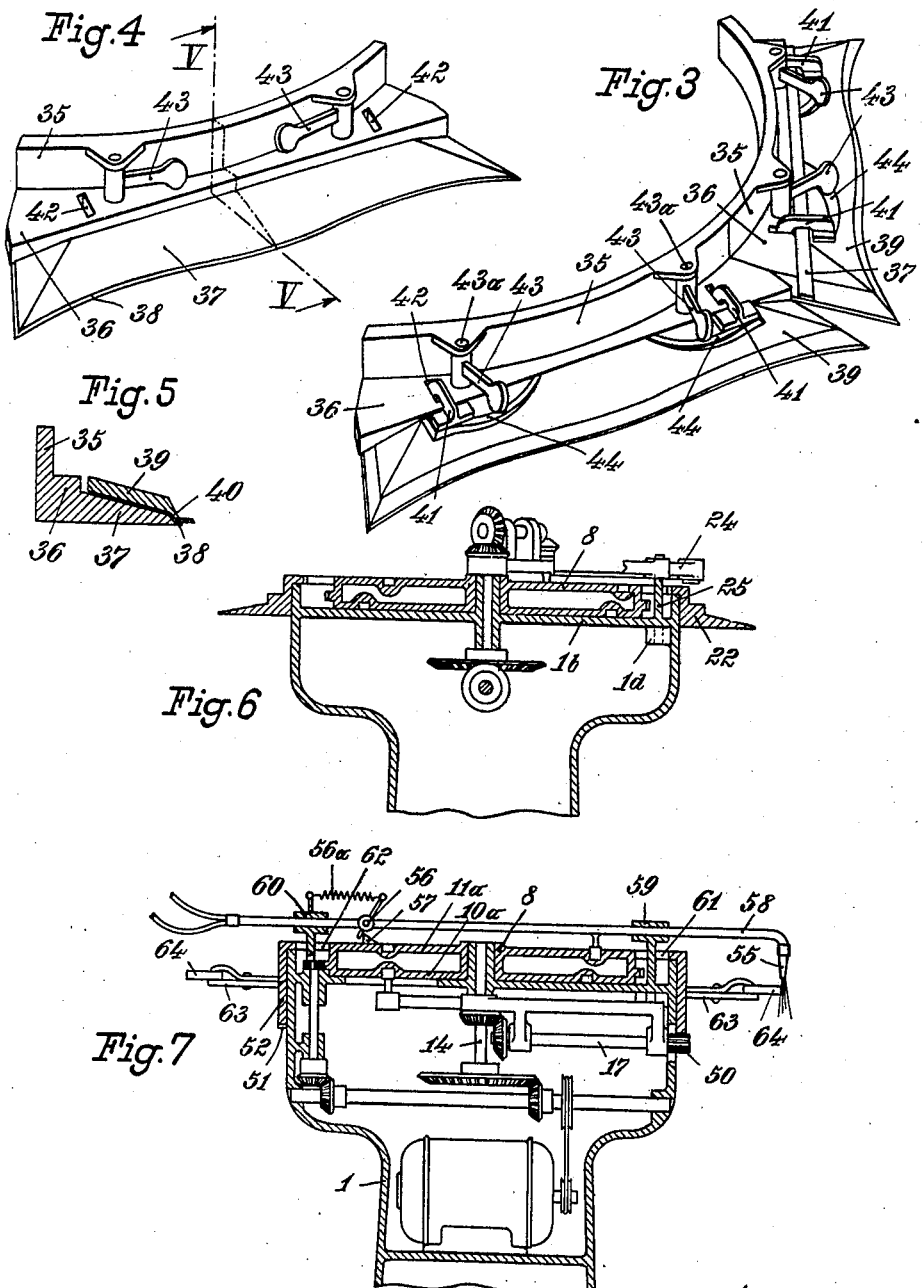

Patented Mar. 28, 1944

2,345,104

UNITED STATES PATENT OFFICE 2,345,104

APPARATUS FOR MOVING TOOL MEANS IN AN IRREGULAR PATH

Walter Hugo Dittrich, Burgstadt, Germany; vested in the Alien Property Custodian Application April 22, 1940, Serial No. 331,044 In Germany May 5, 1939

6 Claims. (Cl. 112—2)

The invention relates to apparatus for the uniform treatment of curve-like extending edges or faces of workpieces, especially for quilting edge seams on parts of fabric. The apparatus may be applied with similar success also for the folding in or doubling down of the edges of parts of fabric and also for the most treating methods in the iron- and metal treating industry especially for milling or also for the autogenous fusing cutting of pieces of metal and sheet metal.

According to the invention the workpieces are fixed on the circumference of a rotary table in uniform radial-symmetrical arrangement. The machine or apparatus, such as a sewing machine, folding in and doubling down device, miller, autogenous cutting device or the like and the rotary table carry out a radial to- and fro movement corresponding to the shape to be treated, whereas at the same time by corresponding gears a changing angular speed is imparted to the rotary table said speed adapted to the actual shape so that the workpiece is moved at uniform speed along the edge to be treated.

It is advantageous, to arrange the workpieces, for instance cut pieces of fabric, paper or cardboard or the sheet metal plates, on the circumference of the rotary tube so that the inner edges form at the same time the sides of regular polygons, especially of a regular hexagon, these sides touching at every corner of the polygon so that the end of the preceding workpiece bears against the beginning of the next following piece.

According to the invention the workpiece carrier is rotated through the intermediary of variable speed gearing, the ratio of which is regulated according to the extension of the curve of the edge or face of the workpieces to be treated.

The workpiece carrier is preferably driven through the intermediary of a differential gear one element of which is driving with a rotary speed regulated according to the shape of the workpiece or of the workpieces. At this rotation it is necessary to compensate a retardation due to the shape of the workpiece, when the workpiece is passing through certain points, by corresponding acceleration, so that at the beginning of the next following workpiece to be treated the corresponding element of the gear is again at the same point relative to the stationary machine frame.

It is advisable that the curved disc for the gear as well as the curved disc for the control of the mutual shifting of workpiece carrier and treating device are arranged coaxially, united to a common rotary body and therefore driven at the same time and at such high number of revolutions that this rotary body during the working of every single workpiece carries out a complete revolution. The curve-discs may also be arranged coaxially to the workpiece carrier.

A better form of construction is obtained, when the differential gear for the driving of the workpiece carrier is constructed as a planet gear, the sun wheel of which is rotated at uniform speed and the planet carrier of which is moved to and fro at a rotary speed regulated according to the shape of the curve.

The mutual shifting of the carrier and of the working device can be effected suitably also from one and the same curved disc. It is immaterial, whether the radial shifting is imparted to the workpiece carrier or to the workpiece.

When the device according to the invention is employed for quilting by means of a sewing machine and when the direction of the seam is altered, it is not necessary to turn the workpiece relative to the sewing machine in order to obtain the desired sewing direction, but it is sufficient to move the sewing machine parallel to itself in order to carry out seams transversely to the otherwise usual sewing direction. The feeding of the fabric is not effected by the commonly used sewing machine transporter but by the device according to the invention.

The invention relates further to a clamping device composed of a cover pressed by clamping means against a bottom part and serving especially for the holding of ready cut parts of fabric, paper and the like and especially for holding at the quilting of cut parts of fabric by means of edge seams. The bottom part having a plane lower surface increases in thickness from the edge towards the middle, the cover plate having a corresponding hollow shape.

Two embodiments of the invention are illustrated in the accompanying drawings, one for quilting the edge seams for cut fabric parts and the other on an apparatus for fusing cutting workpieces of metal and iron.

Figure 2:
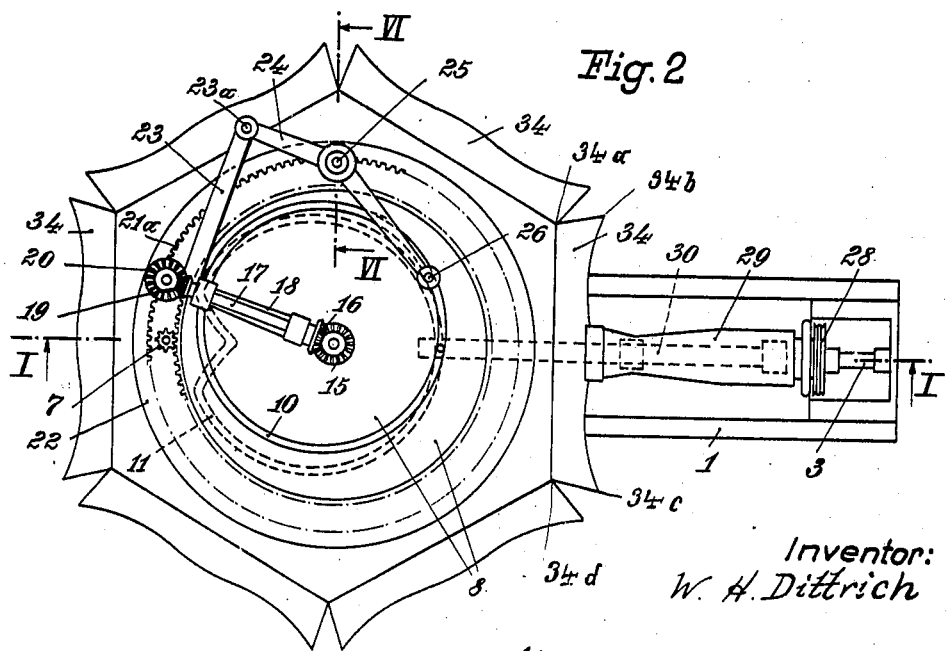

Fig. 1 is a vertical section through the machine taken on the line I—I of Fig. 2, Fig. 2 is a top plan view of the machine, Fig. 3 shows two holding devices for the fabric parts in perspective view, the covers being closed, Fig. 4 is a perspective view of a holding device, the cover being removed, Fig. 5 is a section taken on line V—V of Fig. 4 showing a holding device with the cover, Fig. 6 is a section taken on line VI—VI of Fig. 2, Fig. 7 an axial section through a machine of modified construction and destined for cutting of sheet metal parts.

The driving motor 2 is mounted in the machine frame 1 on an intermediate carrier 1a and drives, by means of a belt 2a, a shaft 3 journalled in the machine frame in three bearings 3a, 3b, and 3c. An intermediate shaft 6, journalled in the machine frame on the upper plate 1b, is driven from the shaft 3 by means of bevel gear wheels 4 and 5, and a control body 8 with external teeth 8a is driven at uniform speed from the intermediate shaft 6 by means of a pinion 7. The control body 8 is rotatably mounted on a hollow pin 9 arranged on the top plate 1b of the machine frame 1 and has a curved slot 10 in its upper face and a curved slot 11 in its lower face.

An intermediate shaft 14, journalled in the central bore of the hollow pin 9, is driven from shaft 3 by means of bevel gear wheels 12, 13 and drives by means of bevel gear wheels 15, 16 a swingable shaft 17. This shaft 17 is journalled on a carrier 18 oscillatable about the hollow pin 9 or about the intermediate shaft 14 and drives by means of bevel gear wheels 19, 20 and a pinion 21 mounted on the carrier 18. This pinion 21 meshes with corresponding internal teeth 21a of a ring 22, the latter being rotatably mounted on a cylindrical flange 1c projecting from the top plate 1b of the machine frame, and carries the holding devices for the turn-down collars to be quilted.

One end of a link 23 acts on the carrier 18, the other end of the link being hingedly mounted, by means of a pin 23a, on one arm of a double arm lever 24. This double arm lever 24 is oscillatably mounted on a pin 25 fixed on a socket 1d of the machine frame 1, as shown in Fig. 6. The pin 25 projects into the space between ring 22 and control body 8 and above this space. On the second arm of the double arm lever 24 a roller 26 is fixed which projects into the curved slot 10 of the control body 8.

The sewing machine 29 is driven from the shaft 3 by means of a belt 27a and belt pulleys 27, 28, the sewing machine being shiftable on the machine frame 1 in sliding guides radial to the rotary table. A connecting rod 30 is fixed on the sewing machine 29 and carries at its free end a roller 31 which projects into the lower curved slot 11 of the control body 8. A fork 32 of the connecting rod 30 engages in a corresponding annular groove of a hub 33 of the belt pulley 27, this belt pulley being shiftable on the shaft 3 by a groove and a key 33 but is rotated with this shaft.

The devices 34 for holding the cut fabric pieces are indicated in Figures 1 and 2 only by their contours, in order not to obscure the illustration. The details of these holding devices are shown in Figs. 3 to 5 and will be hereinafter described.

The operation of the machine is as follows:

By means of the connecting rod 30, the roller 31 of which engages in the curved slot 11 of the control body 8, the sewing machine 29 is continually shifted in radial directions on rotation of the ring 22 carrying the holding devices for the cut pieces of fabric, so that the sewing needle is always directly at the side of the edge of a holding device 34 or in an operative position. At the same time during the rotation of the ring 22 a reciprocating swinging movement is imparted, by means of the link 23 actuated by the double lever 24, to the pinion 21 on the carrier 18, said pinion meshing with the internal teeth of the ring 22.

As the bevel wheel 15 is the sun wheel of the planet gear, a rotary movement is imparted to the workpiece carrier 22 by the swinging movement of the carrier 18 of the circulating wheel, which carrier carries the pinion 21 and represents a planet carrier, this rotary movement varying as regards angular speed and is either accelerated or retarded relative to the uniform rotary movement of the control body 8. Direction and amplitude of this variable rotary movement are determined by the shape of the curved slot 10 of the control body 8. This shape is carried out according to the shape of the cut pieces of fabric to be quilted, so that, when the sewing machine moves from 34a to point 34b, as shown in Fig. 2, owing to the rotation of the rotary table and the to and fro movement of the sewing machine the workpiece holder carries out a rotation at lower angular speed than when the sewing machine moves from point 34b to the point 34c and the rotary body moving again at lower angular speed along the distance 34c to 34d, if the sewing machine itself rotates at constant number of revolutions, so that the sewing needle carries out uniform movements during the passing over the distances 34a, 34b, 34c and 34d.

The acceleration of the angular speed of the workpiece holder will occur in accordance with the construction of the gear when the carrier 18 moves in the direction of the rotating movement of the control body 8. A retardation of this turning movement will occur, however, when the carrier 18 is moved in a direction opposite to the direction of rotation of the workpiece holder.

If the carrier 18 at the beginning of the work on every fresh workpiece has to assume the same position, the control curve must be closed and a movement of the carrier 18 due to the retardation must be compensated again by subsequent acceleration.

It may further be mentioned that standstill of the workpiece holder is obtained, when the carrier 18 is oscillated at a speed of similar amplitude but in opposite direction to that in which the control body 8 rotates, and that even a backward movement of the workpiece holder can be obtained when the carrier arm 18 is oscillated more rapidly than the control body 8 rotates at normal rotating speed.

From the fact, that the control body 8 in the machine described carries out a complete rotation, whereas the ring 22, which carries the cut pieces of fabric to be quilted moves through the sixth part of a revolution, favorable control conditions result for the curved slots 10 and 11 of the control body 8, so that the controlled elements are moved with the greatest possible accuracy.

For clamping-in fabric parts to be worked for instance to neck bands of shirts the holding devices shown in Figs. 3 to 5 serve. Each holding device comprises a sector 35, which is fixed on the ring 22 or made in one piece with the same, and it is further equipped with a flange-like bent off horizontal extension 36 the front part of which is of such shape that an approximately flat pyramid-shaped lower part 37 is produced. The outer shape of this lower part 37 is adapted to the shape of the neck-bands which have to be made and has a wall thickness increasing from the edge towards the middle, as shown in Fig. 5, so that the pyramid shape mentioned results, whereas the lower surface is plane.

A groove 38 is provided in the edge of the lower part 37 by which groove the wall thickness of the lower part is suddenly reduced to a minimum remaining uniform up to the edge. The cover 39 to be placed on the lower part 37 has a hollow shape corresponding to the shape of the lower part 37 and a lip-like projection 40 projecting into the groove 39 of the lower part 37, as shown in Fig. 5. The hinge elements 41 of cover 39 engage in corresponding recesses 42 of flange 36, so that the cover can be folded up about the pins of the hinge elements 41. For pressing the cover 39 on to the lower part 37 two pairs of clamping levers 43 are arranged on each sector 35 and oscillatable about vertical pins 43a, which levers can be made to engage with inclined faces 44 on the cover 39, so that this cover is securely pressed on to the lower part 37 by wedge effect.

For inserting the cut pieces of fabric the clamping levers 43 are turned back into position, shown in Fig. 4. The cover 39 is then folded up and the cut pieces of fabric are inserted. When the cover 39 is folded down, the cut pieces of fabric are pressed by rib 40 on the cover into the groove 38 of the lower part 37 and thus particularly securely held on the edge. After folding down the cover 39 this cover is pressed on to the lower part 37 by oscillating the clamping levers 43. The cut pieces of fabric are then securely held in the holding device.

The groove 38 in the lower part 37 and the corresponding lip-like rib 40 of the cover 39 perfectly fulfill their object, when the depth of the groove and the height of rib 40 are only about ½ mm. This measure is shown greater in order to particularly clearly illustrate the effect when clamping the cut pieces of fabric. When the groove 38 and the rib 40 are of correct dimensions, distortion of the cut pieces of fabric cannot take place.

In Fig. 7 apparatus for cutting of sheet metal parts is illustrated. Material elements of this machine are constructed according to the elements of the machine above described, with the difference however that a burner is provided instead of the sewing machine, the feed tubes 58 of the burner being constructed to serve at the same time as a carrier for the cutting nozzle and so that it is shiftable horizontally and in direction of the diameter of the rotatable plate in two guide bearings 59 and 60. The bearings 59 and 60 are fixed on the machine frame 1. The control body 8 carries, as in the form of construction above described, two curved discs or stencils 10a and 11a in which the curved disc 10a is however at the bottom and the curved disc 11a on the top. The position of the corresponding grooves or slots are also accordingly interchanged, so that the groove 10 is at the bottom and groove 11 at the top. As shown in Fig. 7, the planet gear is consequently arranged below the curved discs, this presenting the advantage that the gear is located oil-tight and dirt-tight in the inner casing of the machine frame. In the form of construction illustrated the planet gear is further simplified in that one of the shafts is omitted. A pinion 50 on the horizontal shaft 17 meshes directly with the teeth 51 on a cylinder flange 52, and carries the workpiece holders 63 in which the workpieces 64 are held by clamping devices.

As for the cutting an additional control of the gas supply is necessary, in order to first pre-heat the fresh workpiece at the beginning of a fresh cutting, control cams 57 are mounted on the upper stencil 11a and act, when they are turned, upon a lever of a gas cock 56 mounted in the gas pipe 58. The cock, when liberated by the cams 57, is automatically returned into the initial position by the action of a spring 56a.

I claim:

1. Apparatus for moving tool means in an irregular path relative to an element to be operated on by the tool means comprising, a frame, a control member rotatably mounted on said frame, means driving said control member to rotate the same, cams carried by said control member, tool means mounted on the frame for movements radially of said control member, an annular member for supporting an element to be operated on by said tool means surrounding said control body and rotatable on said frame, gear teeth carried by said annular member, a pinion driven by the driving means meshing with said gear teeth, means moved by one of said cams for moving said pinion circumferentially of said annular member, and means moved by the other cam for moving the tool means radially of said annular member.

2. Apparatus for moving tool means in an irregular path relative to an element to be treated by the tool means comprising, a frame, a control member rotatably mounted on said frame, means driving said control member to rotate the same, cams carried by said control member, tool means mounted on the frame for movements radially of said control member, an annular member for supporting an element to be operated on by said tool means surrounding said control member and rotatable on said frame, gear teeth carried by said annular member, a planet gear meshing with said gear teeth, a sun gear driven by said driving means, means swingable about the axis of the sun gear providing a driving connection between said planet gear and said sun gear, means moved by one of said cams for actuating said swingable means, and means actuated by another of said cams for moving the tool means radially of said annular member.

3. Apparatus for moving tool means in an irregular path relative to an element to be treated by the tool means comprising, a frame, a control member rotatably mounted on said frame, means driving said control member to rotate the same at a uniform speed, cams carried by said control member, tool means mounted on the frame for movements radially of said control member, an annular member for supporting an element to be operated on by said tool means surrounding said control member and rotatable on said frame, gear teeth carried by said annular member, differential gear means including a planet gear meshing with said gear teeth providing a driving connection between said driving means and said annular member, means actuated by one of said cams for varying the position of said planet gear to alter the rotation of the annular member, and means actuated by the other cam for moving the tool means radially of the annular member.

4. Apparatus for moving tool means in an irregular path relative to an element to be treated by the tool means comprising, a frame, a control member rotatably mounted on said frame, means driving said control member to rotate the same, cams carried by said control member, tool means mounted on the frame for movements radially of said control member, an annular member for supporting an element to be operated on by said tool means rotatably mounted on said frame concentrically of said control member, gear teeth carried by said annular member, a planet gear meshing with said gear teeth, a sun gear driven by said driving means, means swingable about the axis of the sun gear providing a driving connection between said planet gear and said sun gear, a pivotable lever moved by one of said cams for actuating said swingable means, and means connected to the tool means actuated by another of said cams for moving the tool means radially of said annular member.

5. Apparatus for moving tool means in an irregular path relative to an element to be operated on by the tool means comprising, a frame, a disc rotatably mounted on said frame, driving means rotating said disc, said disc having curved slots therein, tool means mounted on the frame for movements radially of said disc, a ring for supporting an element to be operated on by said tool means rotatably mounted on said frame concentrically of the disc, gear teeth carried by said disc, a planet gear meshing with said gear teeth, a sun gear driven by said driving means, an arm swingable about the axis of the sun gear supporting said planet gear, means carried by said arm providing a driving connection between said planet gear and said sun gear, means engaging one of said curved slots for swinging said arm, and means engaging another of said curved slots for moving the tool means radially of said annular member.

6. Apparatus for maintaining a sewing machine in an operative position adjacent the edge of an irregular shaped article to be stitched comprising, a frame, a control member rotatably mounted on said frame, driving means rotating the control member, cams carried by said control member, a sewing machine mounted on the frame for movements radially of said control member, an annular member rotatably mounted on the frame concentrically of the control member, means carried by said annular member for supporting the article to be stitched, gear teeth carried by said annular member, a planet gear meshing with said gear teeth, a sun gear driven by said driving means, means swingable about the axis of the sun gear providing a driving connection between said planet gear and said sun gear, means moved by one of said cams for actuating said swingable means, and means actuated by another of said cams for moving the sewing machine radially of said annular member.

WALTER HUGO DITTRICH.